United States Patent
Chen et al.

(10) Patent No.: US 11,572,166 B2
(45) Date of Patent: Feb. 7, 2023

(54) UNMANNED AERIAL VEHICLE OPERATION SYSTEMS

(71) Applicant: FUJITSU LIMITED, Kawasaki (JP)

(72) Inventors: Wei-Peng Chen, Fremont, CA (US); Daisuke Mashima, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 1069 days.

(21) Appl. No.: 15/072,172

(22) Filed: Mar. 16, 2016

(65) Prior Publication Data

US 2017/0267343 A1   Sep. 21, 2017

(51) Int. Cl.
   *G06Q 10/08* (2012.01)
   *B64C 39/02* (2006.01)
   *G08G 5/00* (2006.01)

(52) U.S. Cl.
   CPC ..... *B64C 39/024* (2013.01); *G06Q 10/08355* (2013.01); *G08G 5/0026* (2013.01); *G08G 5/0034* (2013.01); *G08G 5/0069* (2013.01); *G08G 5/0095* (2013.01); *B64C 2201/042* (2013.01); *B64C 2201/066* (2013.01); *B64C 2201/128* (2013.01); *B64C 2201/141* (2013.01); *B64C 2201/182* (2013.01)

(58) Field of Classification Search
   CPC ................ G06Q 10/08355; B64C 39/024
   USPC ...... 705/332, 330, 7.11, 1.1; 701/3, 4, 7, 11, 701/23
   See application file for complete search history.

(56) References Cited

U.S. PATENT DOCUMENTS

| | | | | |
|---|---|---|---|---|
| 4,011,752 A | * | 3/1977 | Fowler | G01P 13/02 73/170.11 |
| 9,747,809 B2 | * | 8/2017 | Levien | G08G 5/04 |
| 9,776,716 B2 | * | 10/2017 | Levien | B64C 39/024 |
| 9,821,910 B1 | * | 11/2017 | Suiter | G08G 5/0078 |
| 10,375,359 B1 | * | 8/2019 | Beard | G06T 7/204 |
| 2014/0032034 A1 | * | 1/2014 | Raptopoulos | G08G 5/0069 701/25 |
| 2014/0277834 A1 | * | 9/2014 | Levien | B64C 39/024 701/2 |
| 2016/0104111 A1 | * | 4/2016 | Jones | G06Q 10/08345 |
| 2017/0190423 A1 | * | 7/2017 | Salgueiro | B64F 1/12 |

OTHER PUBLICATIONS

Wei Ren, and R.W Beard. "Trajectory Tracking for Unmanned Air Vehicles with Velocity and Heading Rate Constraints." IEEE transactions on control systems technology 12.5 (2004): 706-716. Web. (Year: 2004).*

(Continued)

*Primary Examiner* — Akiba K Robinson
(74) *Attorney, Agent, or Firm* — Maschoff Brennan (57) ABSTRACT

A method of deploying an unmanned aerial vehicle (UAV) operation system may be provided. A method may include estimating an amount of traffic for one or more routes based on a demand of the one or more routes. The method may also include determining a required number of docking stations for each route of the one or more routes based on the estimated amount of traffic for the route, a distance of the route, and a maximum travel distance for a UAV. Further, the method may include installing the required number of docking stations for each route of the one or more routes, wherein each docking station of the required number of docking stations including at least one of a power supply, a wireless charger, a communication module, a control module, and a camera.

14 Claims, 8 Drawing Sheets

(56) References Cited

OTHER PUBLICATIONS

"Unmanned aerial vehicle," Wikipedia Retrieved on Mar. 15, 2016. Retrieved from: <https://en.wikipedia.org/wiki/Unmanned_aerial_vehicle>.
DHL,"DHL parcelcopter launches initial operations for research purposes," Press Release on Sep. 24, 2014. Retrieved from: <http://www.dhl.com/en/press/releases/releases_2014/group/dhl_parcelcopter_launches_initial_operations_for_research_purposes.html>.
Amazon Prime Air, Retrieved on Mar. 15, 2016. Retrieved from: <http://www.amazon.com/b?node=8037720011>.
Flirtey, Retrieved on Mar. 15, 2016. Retrieved from: <http://flirtey.com/>.
MatterNet, Retrieved on Mar. 15, 2016. Retrieved from: <https://mttr.net/>.
HiveUAV, Retrieved on Mar. 15, 2016. Retrieved from: <http://www.hiveuav.com/>.
SkySense, Retrieved on Mar. 15, 2016. Retrieved from: <http://skysense.co/>.
Lavars, Nick, "SkySense pad starts charging your drone the moment it lands," Gizmag, Nov. 4, 2014. Retrieved from: <http://www.gizmag.com/skysense-pad-charging-drone-lands/34592/>.
Durso, Giovanni, "Autonomous recharging and docking for multirotors," HackADay.IO, Aug. 21, 2014. Retrieved from: <https://hackaday.io/project/2759-autonomous-recharging-and-docking-for-multirotors>.
Martinoli, Alcherio and Alexander Bahr, "Docking and recharging of a flying UAV," WS 2011-2012, No. DISAL-SP42. Retrieved on Mar. 15, 2016.
Ahuja, R., et al. (1993). Network flows : Theory, algorithms, and applications, Prentice Hall.
"Air traffic control," Wikipedia Retrieved on Mar. 15, 2016. Retrieved from: <https://en.wikipedia.org/wiki/Air_traffic_control>.

\* cited by examiner

UNMANNED AERIAL VEHICLE OPERATION SYSTEMS

FIELD

The embodiments discussed herein are related to unmanned aerial vehicle operation systems.

BACKGROUND

Unmanned aerial vehicles (UAVs), which are also referred to as remotely piloted aircraft systems (RPAS), remotely piloted vehicles (RPVs), drones, and the like, are aircrafts without an on-board human pilot. UAVs are used in many civilian applications such as surveillance, filmmaking, law enforcement, rescue, agriculture, and logistics.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure include a method of deploying an unmanned vehicle delivery (UAV) delivery system. The method may comprise estimating an amount of traffic for one or more routes based on a demand of the one or more routes. The method may also include determining a required number of docking stations for each route of the one or more routes based on the estimated amount of traffic for the route, a distance of the route, and a maximum travel distance for a UAV. Further, the method may include installing the required number of docking stations for each route of the one or more routes, wherein each docking station of the required number of docking stations includes at least one of a power supply, a wireless charger, a communication module, a control module, and a camera.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

The present disclosure relates to UAV operation systems. More specifically, various embodiments of the present disclosure relate to designing, deploying and/or utilizing a system for performing one or more operations (e.g., delivery of packages) via a UAV. UAVs may include one or more rechargeable energy storage devices, and the system may include one or more docking stations where an UAV may, for example, rest or be charged.

During a contemplated operation, an operation system may receive a task request (also referred to herein as an "inquiry of service") (e.g., from a consumer). In one embodiment, the task request may include a delivery task request. In this example, the task request may include a pickup address, a delivery address, a pickup time, class of delivery service (e.g., based on price), and a delivery time. In response to the task request, a controller of the system may determine a type of UAV to be used, a specific UAV to be used, and a route, including any necessary docking stations, to complete the task. Further, the controller may determine a schedule to complete the task. In one embodiment, forecast weather data may be considered in determining the UAV, the route, including any necessary docking stations, and the schedule.

Further, the system may reply to a consumer, identifying, for example, a pickup time, a delivery time, and a price. Upon the consumer agreeing to the service terms, the system may reserve resources required to complete the task. Data related to the task, including an execution time, may be saved in a task database. Upon arrival of the execution time, the system may retrieve the data and initiate the task.

Embodiments of the present disclosure are now explained with reference to the accompanying drawings.

Figure 1:
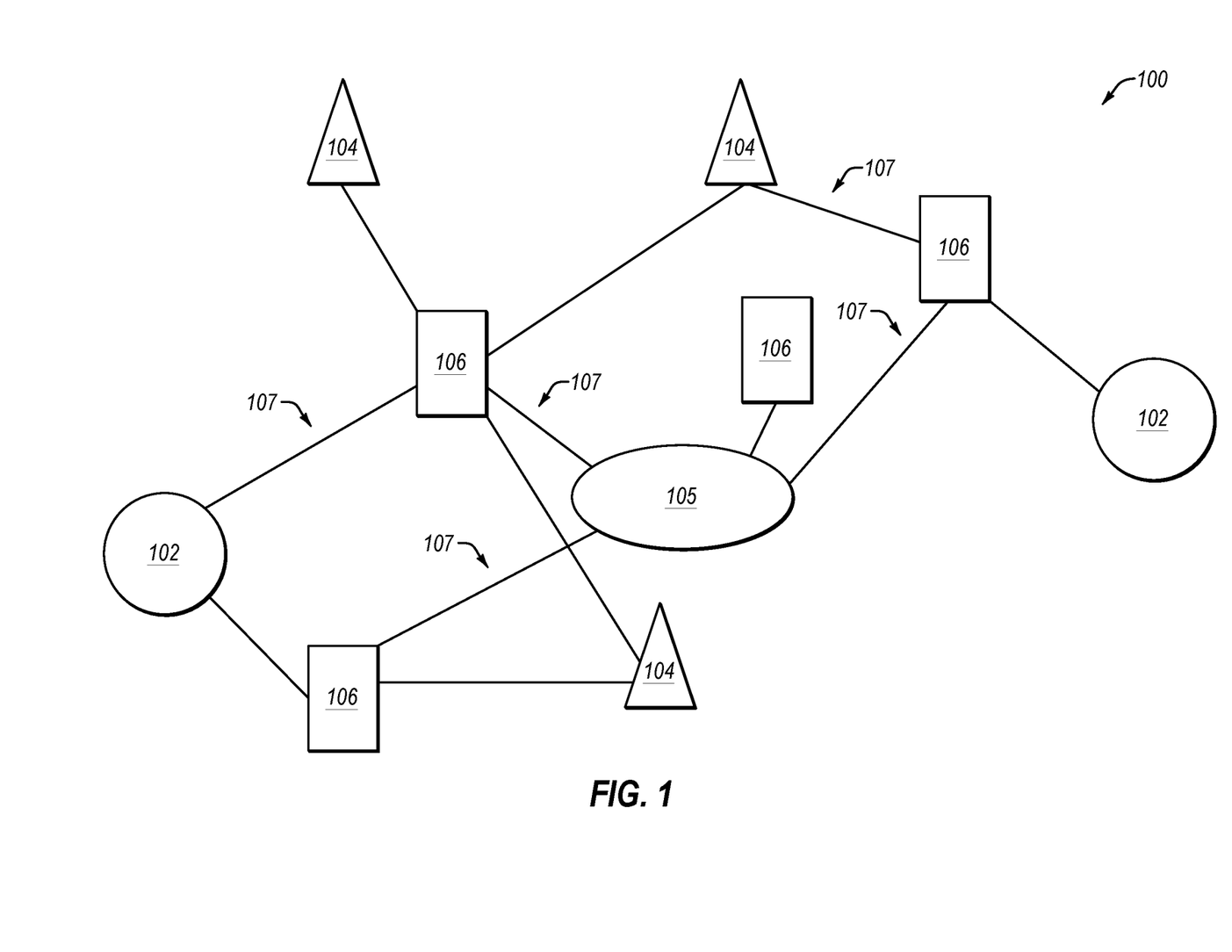
FIG. 1 is a diagram representing an example system for performing operations in an unmanned aerial vehicle operation system.

FIG. 1 depicts an example system 100 including one or more sources 102, one or more destinations 104, a controller 105, one or more docking stations 106 (also referred to herein as "intermediate nodes" or "charging stations"), and a network 107. In one embodiment, system 100 may be configured for package delivery via a UAV, which may receive one or more packages at source 102, and deliver one or more packages to destination 104. In one embodiment, the UAV may dock (e.g., stop to rest and/or receive power) at one or more docking stations 106 while traveling from source 102 to destination 104.

By way of example, source 102 may include any suitable source of a package to be delivered, such as a commercial entity, a government entity, or a residence. Further, destination 104 may include any suitable destination for a delivery package, such as a commercial entity, a government entity, or a residence. A system (e.g., system 100) including a shared, centralized infrastructure to support delivery (e.g., for store-to-door, door-to-door, etc.) via UAVs may lessen government regulatory concerns.

Figure 2:
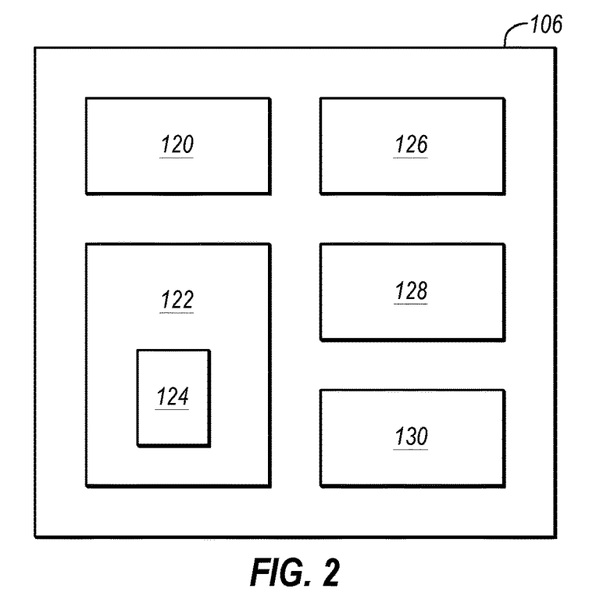
FIG. 2 is a block diagram of a docking station for an unmanned aerial vehicle operation system.

A docking station (e.g., docking station 106) may be positioned at any suitable site, such as on a roof-top, in a warehouse, coupled to a power pole, couple to a street light, etc. FIG. 2 depicts an example docking station 106. According to various embodiments, docking station 106 may include a power supply 120, a charging module 122 including one or more wireless power transmitters 124, a communication module 126, one or more cameras 128, and a control module 130. Cameras 128 may comprise one or more video cameras, one or more still cameras, or any combination thereof.

A docking station (e.g., docking station 106), which is configured for charging UAVs, may provide benefits to a delivery system. For example, a docking station may allow for UAVs to use smaller energy storage devices (e.g., batteries) and, thus, may increase payload capacity, which may reduce electricity costs and overall transportation costs. Further, docking stations may improve a control range and flight range of a UAV. Stated another way, while flying along a route, a UAV may maintain communication with one or more docking stations. Docking stations may reduce communication costs via communicating via Wi-Fi networks. Further, by limiting flight to a limited space, docking stations may mitigate regulatory and/or safety concerns. Further, docking stations may be configured to reuse existing infrastructure, which may reduce costs. For example, docking stations may be configured to reuse existing power poles, communication poles, light poles, and/or surveillance poles.

Figure 3:
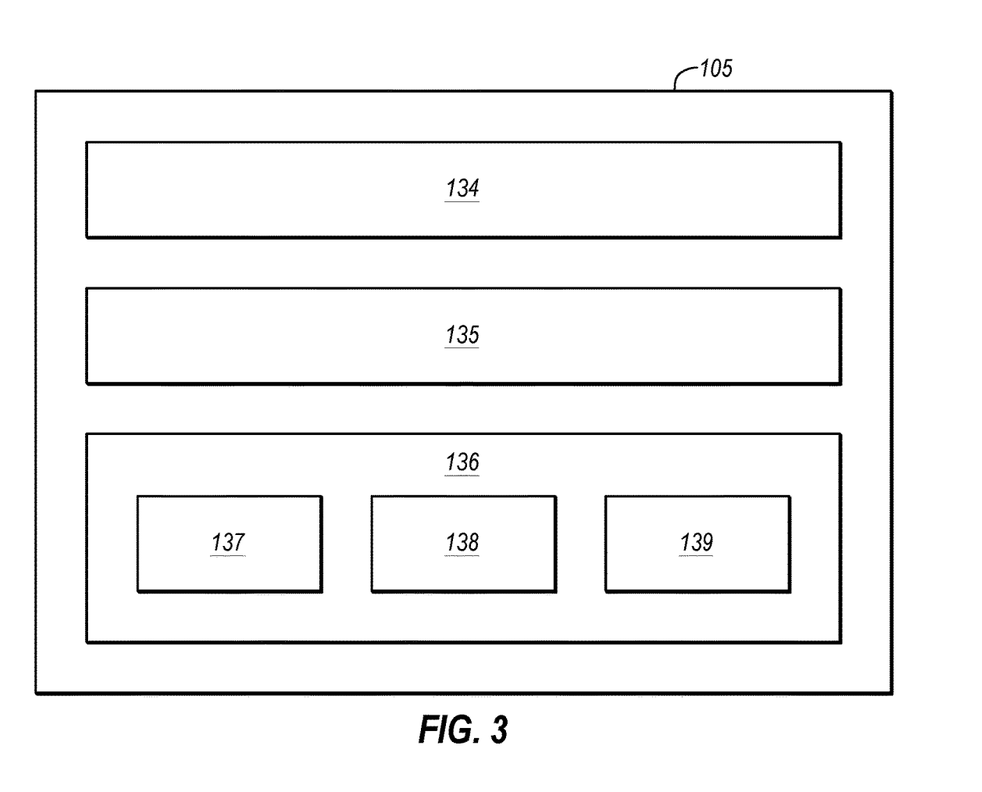
FIG. 3 is a block diagram of a controller of an unmanned aerial vehicle operation system.

System 100 (see FIG. 1) may further include one or more controllers 105 configured to communicate with docking stations 106 and UAVs within system 100. FIG. 3 is a block diagram of controller 105 including a communication module 134 configured for communicating with UAVs and docking stations. Controller 105 may further include a processor 135, and memory 136 for storing data, such as data related to a task (e.g., a task database 137), forecast weather data 138, and data related to a network (e.g., a network database 139).

Processor 135 may be configured to execute instructions stored on any applicable computer-readable storage media. For example, processor 135 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, processor 135 may include any number of processors configured to perform, individually or collectively, any number of operations described in the present disclosure.

Figure 4A:
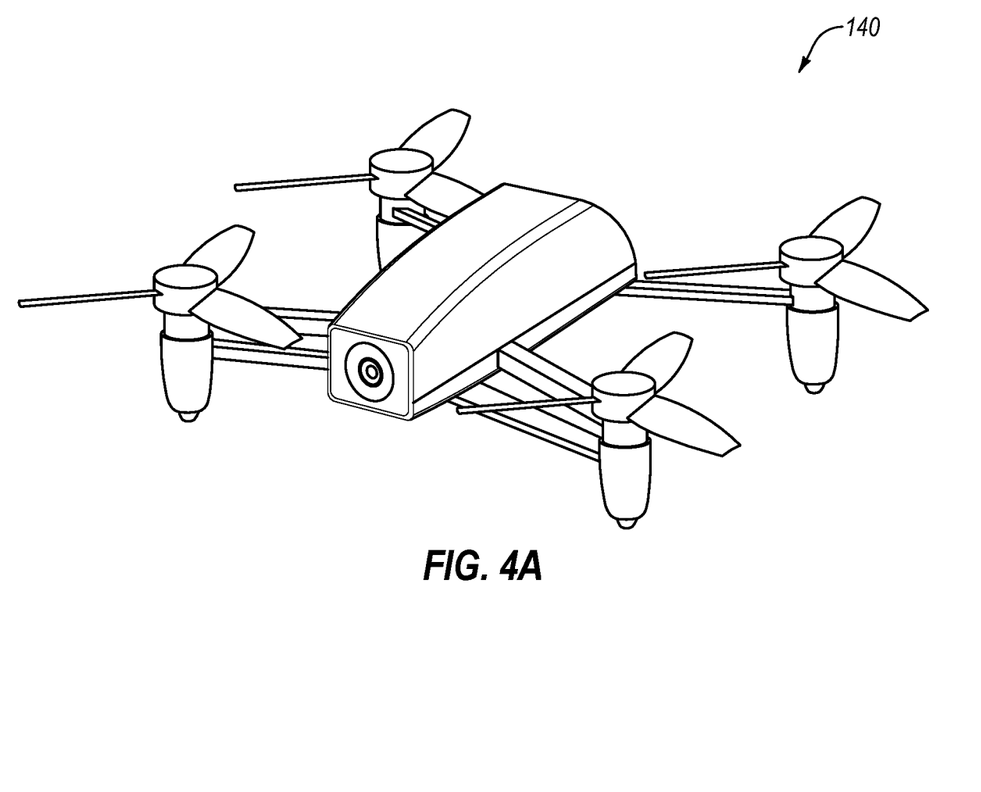
FIG. 4A depicts an example an unmanned aerial vehicle.
Figure 4B:
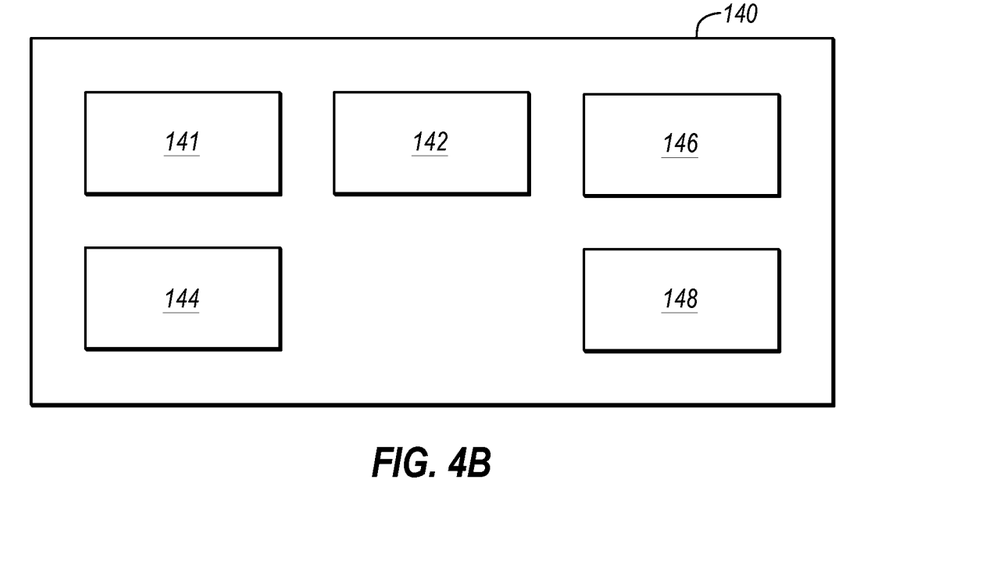
FIG. 4B is a block diagram illustrating various components of an unmanned aerial vehicle.

FIG. 4A depicts a UAV 140, which may comprise any known and suitable UAV, such as a drone. FIG. 4B is a block diagram of a UAV 140, according to an embodiment of the present disclosure. UAV 140 may include a control module 141, a communication module 142 and one or more energy storage devices (e.g., battery packs) 144. UAV 140 may further include a power receiver 146, which may comprise for example, a wireless power receiver. Further, in one embodiment, UAV 140 may include one or more solar panels 148 configured for receiving light energy, converting the light energy to electricity and supplying electricity to UAV 140.

According to various embodiments, a method of deploying a logistics system may include a plurality of phases, including a planning phase, a construction phase, and an operation phase. Further, as described more fully below, an operation phase may include a plurality of sub-phases, such as an inquiry sub-phase and an execution sub-phase.

A contemplated planning phase will now be described. Considering a demand in an area (e.g., a neighborhood, a town, a city, etc.), possible routes, and a route capacity, a network minimum cost flow analysis may be used to determine the feasibility of accepting the demand and the estimation of the cost for the demand. It may not be required to consider required docking stations in this step. Rather, the feasibility based on the route capacity (e.g., a number of UAVs may be supported on a path at any time) may be analyzed.

Initially, an amount of traffic for one or more pairs of regions (e.g., between streets, between neighborhoods, between towns, etc.) may be estimated based on a demand for each pair of region. In one example, a node may represent a region. A route design may include a set of routes, and each route may include a path traversing multiple nodes. Stated another way, a route may include a set of arcs (e.g., links between two nodes). More specifically, given a route design including a set of arcs A with a cost $c_{ij}$ and a capacity $u_{ij}$ for each arc linking two nodes i and j, $(i, j) \in A$ and demand p (source $s_p$, destination $d_p$, and demand $dem_p$), a minimum cost flow analysis may be used to determine the traffic $x_{ij}$ at each arc (i, j) according to the following equations:

$$\min_{\{[x]\}} \sum_{(i,j) \in A} c_{ij} x_{ij} \quad (1)$$

wherein:

$$\sum_{j:(i,j) \in A} \overline{x_{ijp}} - \sum_{j:(j,i) \in A} \overline{x_{ijp}} = dem_p \text{ if } i = s_p; \forall\, p \quad (2)$$

$$\sum_{j:(i,j) \in A} x_{ijp} - \sum_{j:(j,i) \in A} x_{ijp} = -dem_p \text{ if } i = d_p; \forall\, p \quad (3)$$

$$\sum_{j:(i,j) \in A} x_{ijp} - \sum_{j:(j,i) \in A} x_{ijp} = 0 \text{ if } i \neq s_p \text{ or } i \neq d_p; \forall\, p, \text{ and} \quad (4)$$

$$x_{ij} = \sum_p x_{ijp} \text{ and } 0 \leq x_{ij} \leq u_{ij} \ \forall\, (i, j) \in A. \quad (5)$$

Further, based on the determined traffic $x_{ij}$ at each arc, the required docking stations at arc (i, j) to support operation may be estimated according to the following equation:

$$\text{docking stations at arc } (i, j) = x_{ij} \cdot \frac{\text{distance of arc } (i, j)}{\text{travel distance per charge}}. \quad (6)$$

If an infeasible route exists, a new route may be added and/or route capacity may be increased (e.g. add a new route at a new sub-plane). The above-mentioned acts may be repeated until the initial demand is satisfied.

As will be appreciated, various types of UAVs may be configured for different velocities and may have different payload capacities. To simplify route design and flow regulation, UAVs may be classified into different groups based on, for example, operating velocities. Each group of UAVs may operate within a "plane" (e.g., at a specific altitude), which may help avoid complex scheduling issues and, therefore, may reduce the likelihood of collisions.

Figure 5A:
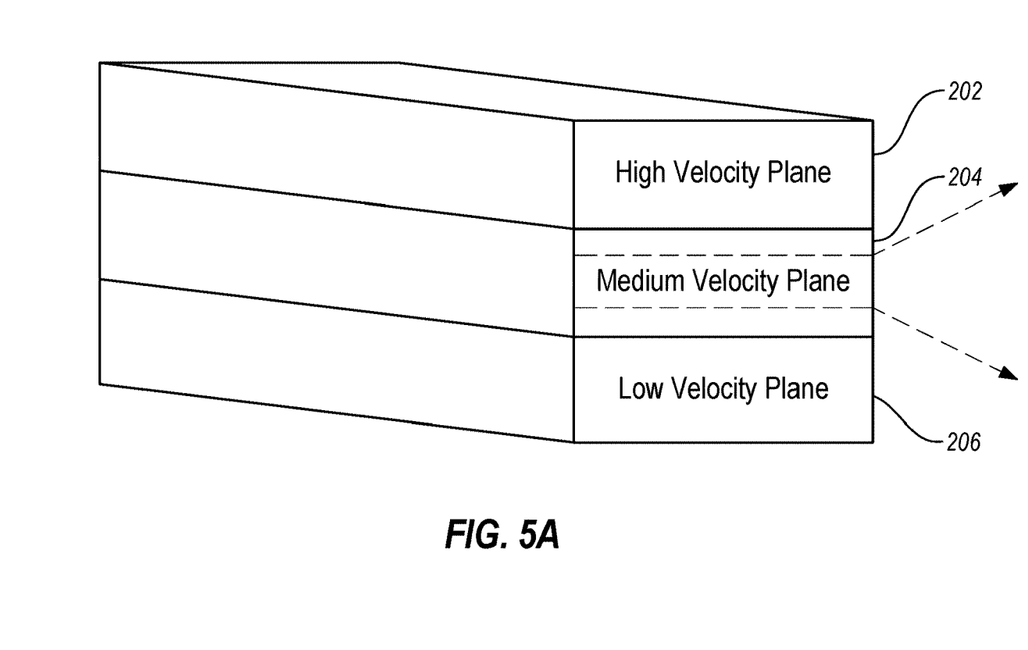
FIG. 5A depicts a plurality of operating planes for an unmanned aerial vehicle operation system.

FIG. 5A depicts a plurality of operating planes, including a high velocity plane 202, a medium velocity plane 204, and a low velocity plane 206. Inside each plane, multiple plenary graphs in a sub-plane may exist. Also, a buffer may exist between sub-planes and planes to reduce the likelihood of collisions.

Figure 5B:
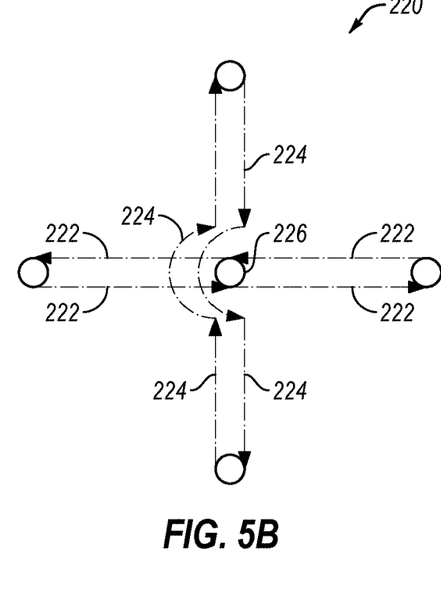
FIG. 5B illustrates a plurality of routes and an intersection point in unmanned aerial vehicle operation system.

A route may across another route at the intersection point. For example, if two routes intersect (e.g., at a same point on a plenary graph), and if traffic is not redirected between these two routes, both routes may be considered to operate independently. If two routes intersect (e.g., at a same point on a plenary graph), and traffic is redirected between routes, a buffer zone around the intersection point may exist. More specifically, with reference to FIG. 5B, two UAV routes 222 and 224 intersect at point 226. Thus, one route (e.g., route 224) may be redirected (e.g., left turn, right turn), and a difference in altitude between a UAV on route 222 and a UAV on route 224 may be at least a predetermined amount.

During a construction phase, the infrastructure of a system (e.g., system 100), including docking stations and/or controller along the one or more routes designed in the planning phase may be built.

During an operation phase, operation of a system (e.g., system 100) may be evaluated. If needed (e.g., upon demand being increased), additional routes, additional docking stations, or both, may be added according to the planning process described above.

As noted above, according to one embodiment, given a task, an operation phase may include one or more subphases. For example, a sub-phase may include an "inquiry sub phase" wherein a customer requests service. If the request is accepted, the system may reserve the required resources and add the task to a task database. Further, a sub-phase may include, for example, an "execution subphase" wherein a task is retrieved (e.g., from a task database) at its specified execution time.

An example inquiry sub-phase will be now be described in general. Initially, a customer may request service (also referred to herein as a "task request"). To request a task, the customer may provide a system with information regarding the task request including, for example, an address for pickup (e.g., a source location), an address for delivery (e.g., a destination location), a date and time window for pickup of a package, a class of delivery service (e.g., based on different prices), a weight and size of the package to be delivered, and a time window for delivery of the package.

Based on information provided by the customer, the system may identify and reserve resources required for the task. More specifically, the system may determine a type of UAV to complete the task, and assign a specific UAV to the task. More specifically, for example, upon receipt of one or more characteristics of a task request (e.g., a size of a package, a weight of the package, the content of the package, a value of the package, etc.), a set of UAV types may be selected as candidates for the task. If a package of a task i has a weight, given a selected type d of UAV, a battery depletion rate $b_{id}$ (unit Wh/s) may be a function of the weight. Moreover, an amount of energy $e_{id}$ required for a UAV to traverse across a zone may be estimated as:

$$e_{id} = l_{sep}/v_d \cdot b_{id} = t_{sep} \cdot b_{id}; \quad (7)$$

wherein $t_{sep}$ is a required separation of UAVs (in the time domain), $l_{sep}$ is an equivalent required separation distance, and $v_d$ is the velocity of the type d of the UAV.

Further, a route, required docking stations, and all schedules may be determined. More specifically, the system may determine a route (e.g., from the initial location of the assigned UAV, to the pickup location, to the delivery location, to an end location for the UAV) to complete the task, including any stops for recharging. Given a user-specified pickup time, for each UAV candidate, a route (e.g., the shortest path) from an initial location to the end location, and an associated cost, may be determined. In one embodiment, it may be assumed that each candidate is fully charged. The cost may be determined according to any known and suitable method. For example, in one embodiment, Dijkstra's algorithm may be used to determine the minimum cost path.

It is noted that in one embodiment, UAV candidates (e.g., UAV type, initial location) and possible pickup times may be considered independently to determine a minimal cost route. Multiple options of UAV candidates and pickup times may be considered simultaneously. In another embodiment, the minimum cost route may be determined by considering UAV candidates and possible pickup times in parallel (e.g., to accelerate the computation time).

A route with the minimum cost may be selected to determine the optimal UAV candidate. The route including one or more docking stations, if needed, and all schedules, may be determined.

A zone may represents a three-dimensional space. A cost associated with a zone j at time t may be represented by a "vertex cost" $c_{jt}$. The value of a vertex cost of traversing from a source to a destination in a zone may be a function of a zone status and a UAV status. In one example, a variable $I_{jkt}$ may indicate the availability of docking station k within zone j at time t. If $I_{j0t}=1$ (e.g., one UAV is flying over zone j at time t), then vertex cost $c_{jt}=\infty$ (or a large constant). Further, if $I_{j0t}=0$ and $I_{jkt}=1$ for all docking stations (e.g., all docking stations associated with zone j at time t are occupied), and a battery level of an assigned UAV flying over the zone j at time t is lower than a threshold ($B_{idjt} < B_d$), vertex cost $c_{jt}=\infty$ (or a large constant). Moreover, if $I_{j0t}=0$ and there exists a docking station k at time t which is not occupied ($\exists k \in N_1$ such that $I_{jkt}=0$), then vertex cost $c_{jt}$=function of required energy $e_{id}$ and available docking stations.

A UAV may be affected by weather conditions (e.g., wind), thus, weather may be considered when selecting a route or a delivery schedule. In one embodiment, a route in location under mild weather conditions may be selected, and/or delivery may be performed when the weather conditions allow.

In one embodiment, a penalty cost may be added to a vertex cost $c_{jt}$ if weather conditions are bad in a zone. Further, weather may affect a required energy for a UAV carrying a package to traverse a zone. That is, based on weather (e.g., wind speed) within a zone, the required energy for the given UAV to traverse the zone may be a function of the wind speed in the zone. Thus, the vertex cost may be associated with the wind speed.

According to one embodiment, an end-to-end route may be identified in the following segments: (1) from an initial location of a UAV (e.g., a warehouse or a docking station) to a pickup location (e.g., a source of the package); (2) from the pickup location to a delivery location (e.g., destination of the package); and (3) from the delivery location to an end location for the UAV (e.g., a warehouse or a docking station).

In another embodiment, which may simplify a searching process, instead of starting from an initial location of a UAV (e.g., a warehouse), a search algorithm may start from a pickup location and back track to the initial location. Further, a lower bound of a battery energy level from the pickup location as a starting status may be specified, and, therefore, may ensure that a UAV has more than a lower bound battery energy level upon arrival at the pickup location.

In yet another embodiment, instead of defining a vertex cost, a segment cost may be used. The route cost may be defined as a function of, for example, distance, congestion level, available docking stations, or any combination thereof.

In one embodiment, a search algorithm may include two phases. In a first phase, a series of segments may be selected based on segment costs without considering battery status. In a second phase, once a route is determined, docking stations (e.g., for charging and congestion avoidance purpose) may be selected. For example, starting from an initial location of a UAV, for every operation time (or distance), a docking station may be identified.

In one embodiment, UAVs may be deployed based on historical demand patterns (e.g., UAVs may be deployed (e.g., positioned at warehouses or docking stations) in high demand areas). Further, after delivery, a UAV may travel to a docking station in a high demand area. For example, before meal time, UAVs may be deployed near restaurants to meet high demand for meal delivery service.

Continuing with the example inquiry sub-phase, in one embodiment, while computing route selection, the resource reservation may be considered a temporary reservation. Official resource reservation may be confirmed later, after a customer agrees with terms of the service.

A system (e.g., system 100; see FIG. 1) may respond to the customers with terms of the service, such as, a pickup time, a delivery time, and a price to complete the task. If the customer agrees to the terms of the service, the system may confirm the reserved resources. As noted above, if the customer agrees with the terms and conditions of the service, the temporary reservation associated with the task request may be change the reservation to an official reservation in a network database. If the customer disagrees with the terms and conditions of the service, the temporary reservation may be deleted.

Thereafter, the task request, including a designated execution time, may be entered into a specific task in a task database. The execution time may be the expected time for the task request to be retrieved from the task database (e.g., at the beginning of the execution sub-phase). The execution time may be specified as a time instance relatively close to the start of the flight scheduling time.

For safety reasons, a 3D zone, wherein at any time only one UAV may be flying, may be defined. On a single route, each UAV may be separated from every other UAV in the time domain by a time $t_{sep}$, or an equivalent distance $l_{sep}=v_d \cdot t_{sep}$, wherein $v_d$ is the velocity of the type d of the UAV. Time $t_{sep}$ may be considered as a basic time slot.

A zone in 3-D may be mapped to a directional arc in 2-D. Each zone j may include a number of docking stations $N_j$. A zone at the same geographical region (x, y) may include a set of docking stations. Thus, the state of a zone at time t may be represented by a ($N_j$+1) vector of binary variables $[I_{jkt}]$, k=0, . . . , $N_1$ wherein if a UAV is travelling at zone j at time t, $I_{j0t}$=1. If a UAV is stopped at a docking station k associated with the zone j at time t, $I_{jkt}$=1. If a UAV stopped at docking station k takes more time than time $t_{sep}$, both $I_{j0t}$ and $I_{jkt}$ may be set equal to 1 for more than one time slot.

To complete an assigned task, a route of a UAV may include a one or more segments, including a segment from an initial location of the UAV (e.g., a warehouse or a docking station) to a pickup location (e.g., a source), a segment from the pickup location to a delivery location (e.g., a destination), and a segment from the delivery location to a ending location (e.g., warehouse or docking station), which may or may not be the same location as the starting location. For explanation purposes only, it may be assumed that a UAV delivers one package for one customer in a given task.

In one example, door-to-door delivery may include a segment from an initial location (e.g., a warehouse or a docking station) to a pickup location (e.g., a source), a segment from the pickup location to a delivery location (e.g., a destination), and a segment from the delivery location to an ending location (e.g., a warehouse or a docking station).

Warehouse-to-door delivery (e.g. to deliver a package from a distribution center to an address may include a segment from the pickup location (e.g., a source) to a delivery location (e.g., destination) and a segment from the delivery location to an ending location (e.g., a warehouse or a docking station).

Door-to-warehouse delivery (e.g. to pick up a package from customer's address and deliver to a distribution center) may include a segment from an initial location (e.g., a warehouse or a docking station) to a pickup location (e.g., a source) and a segment from the pickup location to a delivery location (e.g., destination).

At any given time, a network may include one or more zones, wherein each zone may be modeled as a vector of zone status $[Z_j]=[([I_{jkt}], [id_{jkt}])]$, including the availability of each docking station (or the zone itself), as well as an associated drone identification (ID). Stated another way, when a UAV is travelling at zone j at time t($I_{j0t}$=1), or a UAV is stopped at a docking station k associated with the zone j at time t($I_{jkt}$=1), the identification of the UAV is denoted as $id_{jkt}$.

Figure 6:
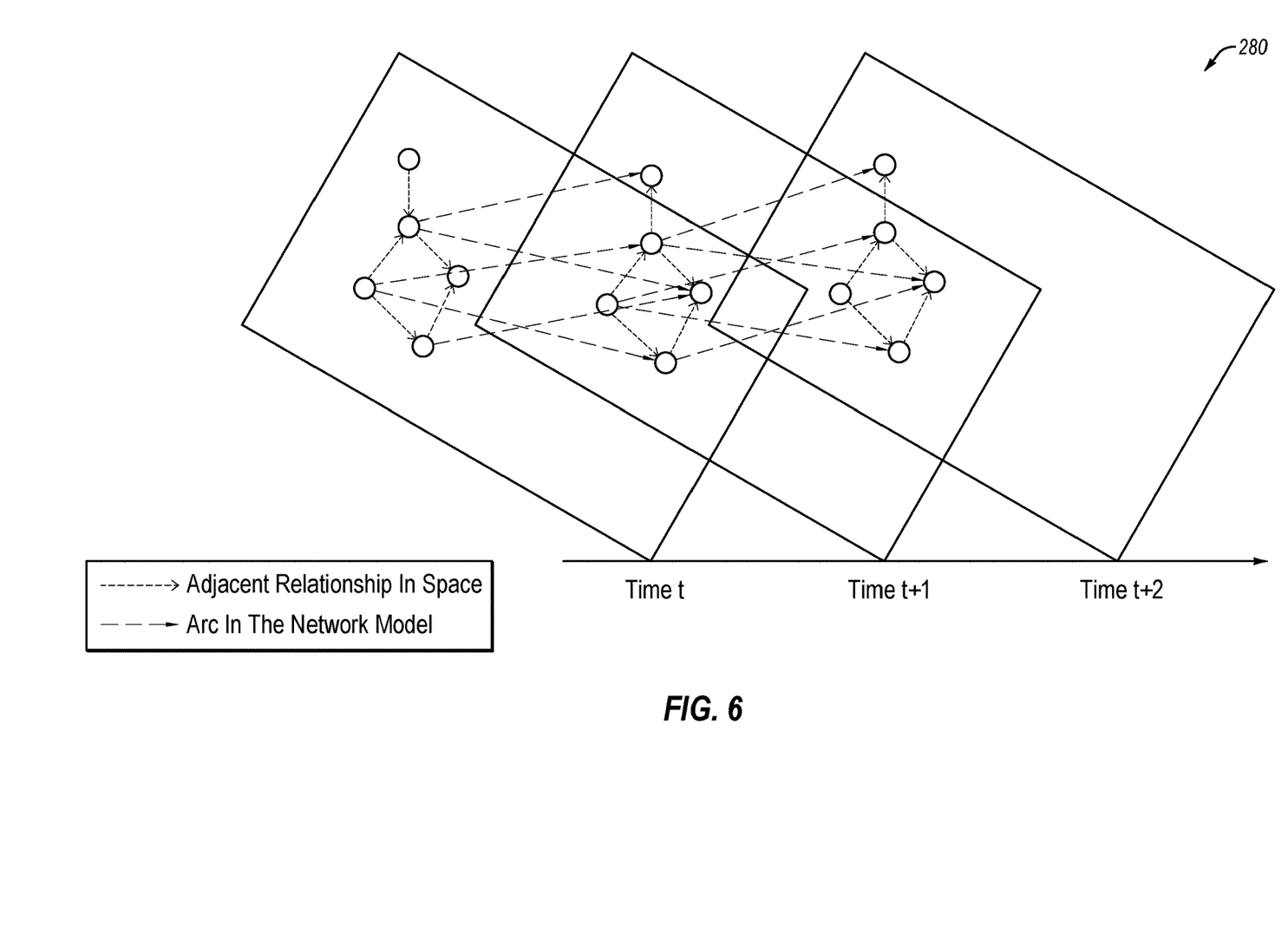
FIG. 6 illustrates a network including a plurality of nodes at various time slots.

With reference to FIG. 6, a network 280 in 4 dimensions (e.g., 3D space and 1D time dimension) may be modeled, wherein a physical 3D zone j at a time instance t is modelled as a vertex $V_{jt}$. Further, an arc to connect two vertices $V_{jt}$ and $V_{j'(t+1)}$ may exist if zone j and j' are adjacent (in space) and a UAV may traverse across two zones within a unit time slot (adjacent in time). Further, an arc to connect two vertices $V_{jt}$ and $V_{j(t+1)}$ may exist if a UAV may stay in the same zone j for two consecutive time slots (e.g. stopping at a docking station).

A contemplated execution sub-phase will be now be described in general. Upon arrival of the task execution time, the task request may be retrieved from the task database, which may start the execution sub-phase. Based on the latest weather forecast, weather conditions of each zone determined during the inquiry sub-phase at the reserved time may be examined. If weather conditions have change dramatically, such that the associated cost is increased dramatically exceeding a threshold, the system may re-run the route selection process, the resource reservation process, or both, in the inquiry sub-phase, as described above.

Further, availability of required resources (e.g., UAV, route, docking stations) may be confirmed. For example, a network database may be checked to ensure whether a reserved resource is still available. Further, in one example, a surveillance video camera, positioned near or at a docking station, may be used to confirm the status of the docking station before scheduling a UAV to stop at the docking station. If necessary, a new route may be selected based on the latest status in the network database.

During operation, a controller (e.g., controller 105; see FIG. 1) may monitor and control one or more UAVs. For example, the controller may continuously monitor a status of a UAV (e.g., in flight or at rest) to verify that the status meets the execution plan. In one embodiment, a docking station with communication capability may act as a local controller to communicate with UAVs in its zone. When a UAV moves across two zones (e.g., from zone 1 to zone 2), a handover signal may be sent from a control module (e.g., control module 130; see FIG. 2) in zone 1 to control module in zone 2 to ensure it does not collide with other UAVs. If any change in the execution plan occurs, the central controller (e.g., controller 105) may adjust the route or schedule.

Figure 7A:
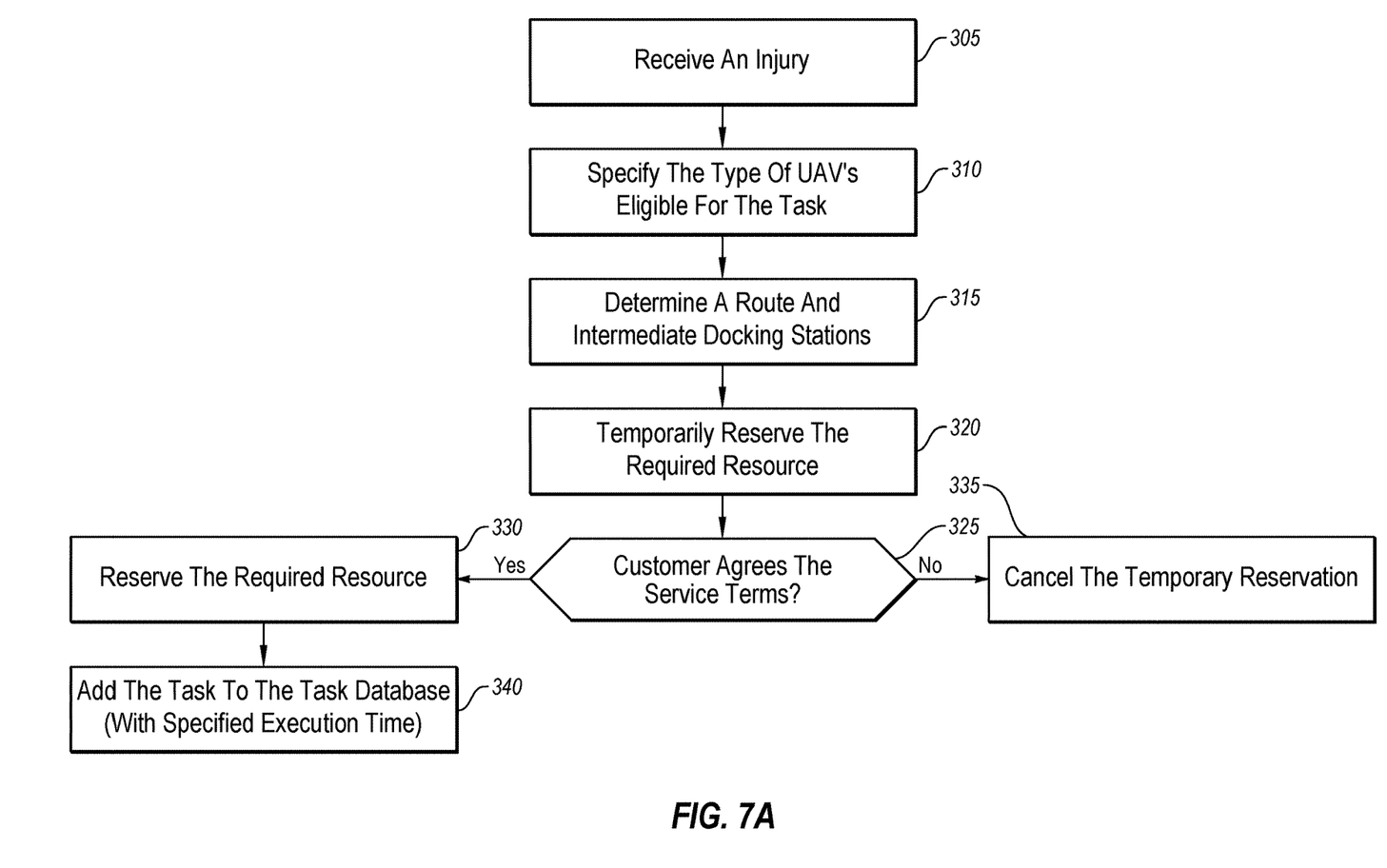
FIGS. 7A and 7B are a flowchart of an example method for delivering packages in unmanned aerial vehicle operation system.
Figure 7B:
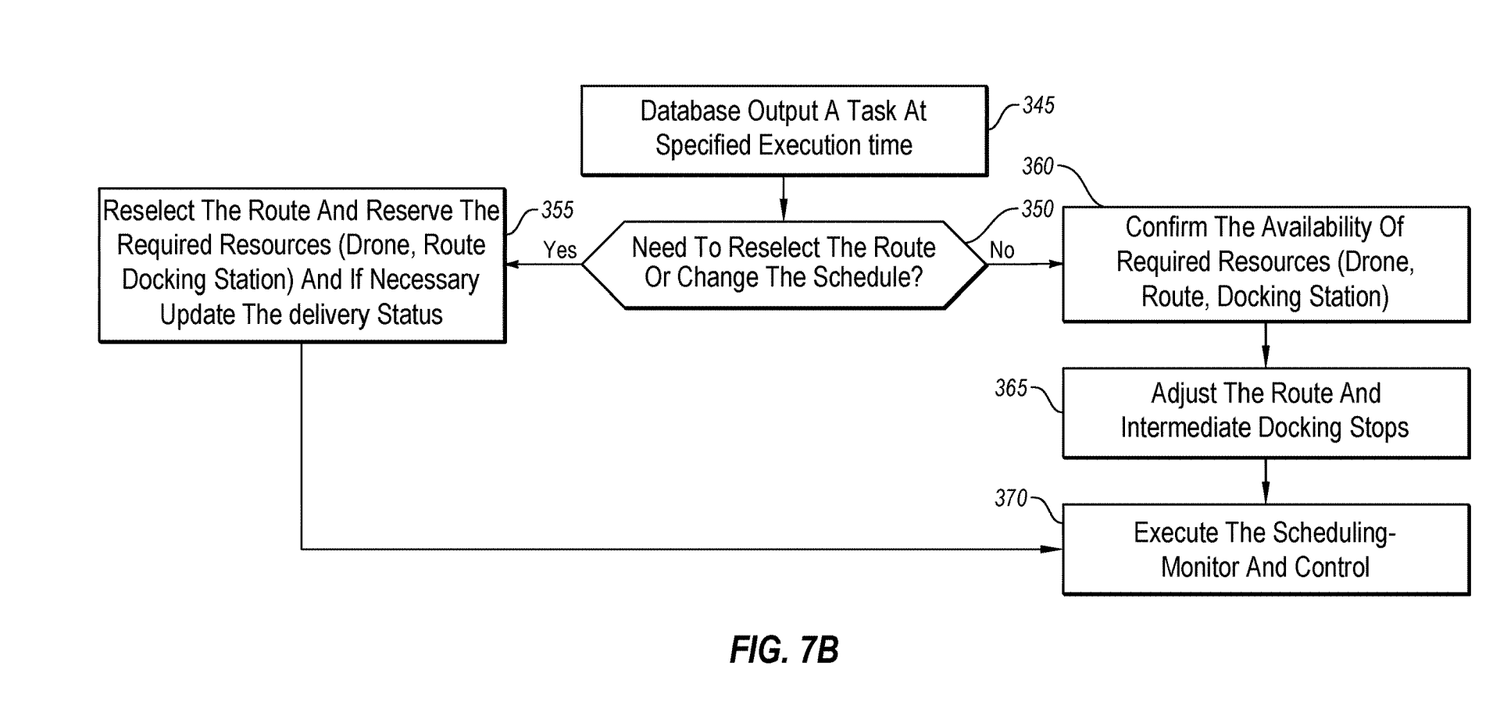

FIGS. 7A and 7B are a flowchart of an example method 300 for handling a received interest packet, in accordance with at least one embodiment of the present disclosure.

Method 300 may be performed by any suitable system, apparatus, or device. For example, system 100 of FIG. 1 or one or more of the components thereof may perform one or more of the operations associated with method 300. In these and other embodiments, program instructions stored on a computer readable medium may be executed to perform one or more of the operations of method 300.

At block 305, an inquiry of service (e.g., a task request) may be received from a user. For example, a user may provide an address for picking up a package (e.g., a source location), a delivery address (e.g., destination location), a time window (e.g., date and time) for picking up the package, a class of delivery service (e.g., based on different prices), a weight of the package, a size of the package, a time window (e.g., date and time) for delivering the package, or any combination thereof.

At block 310, a determination may be made as to which type of UAV is eligible for the task. It is noted that weather forecast data may be considered in determining the type of UAV for the task request. Further, selection of the type of UAV may be based on one or more parameters of the task request (e.g., designated pickup time, designated delivery time, the weight of the package, and the size of the package). A specific UAV for the task may also be identified at block 310.

At block 315, a determination may be made as to which route to select for carrying out the task. For example, a route may be selected based on an original location of the designated UAV, the pickup location, the delivery location, and docking stations necessary to complete the task. Information regarding the selected route may be conveyed to a network database.

At block 320, resources required to complete the task may be temporarily reserved. Stated another way, a temporary reservation may made.

At block 325, a determination may be made as to whether the user agrees to the service terms for completing the task. For example, the service terms may include a pickup time, a delivery time, and a price. If the user does agree the terms, method 300 may proceed to block 330. If the user does not agree to the service terms, method 300 may proceed to block 335.

At block 330, the resources required to complete the task may be reserved. Data related to the reservation may be conveyed to a network database.

At block 335, the temporary reservation may be cancelled. Data related to the cancellation may be conveyed to the network database.

At block 340, the task request, including a designated execution time, may be added to a task database. The execution time may be the expected time for retrieval of the task from the task database and executed during the execution sub-phase. The execution time may be specified as a time instance that is relatively close to a start of a scheduled flight time.

At block 345, the task database may output the task request at the designated execution time, which may begin the execution sub-phase.

At block 350, a determination may be made as to whether the route selected for the task should be reselected or the schedule of the task should be modified. For example, weather forecast data for each zone reserved during the inquiry sub-phase at the given reserved time may be examined. If the weather conditions have change dramatically, for example, such that an associated cost exceeds a threshold, the route selection and resource reservation processes may be completed again. If the route selected for the task does not need to be reselected and the schedule of the task does not need to be modified, method 300 may proceed to block 360. If the route selected for the task needs to be reselected or the schedule of the task needs to be modified, method 300 may proceed to block 355.

At block 355, a route for the task may be reselected and/or the scheduled may be modified, and required resources (e.g., UAV, route, and docking station(s)) for the task may be reserved. Further, a delivery status may be updated, if necessary.

At block 360, the availability of the reserved resources (e.g., UAV, route, and docking station(s)) may be confirmed. For example, the network database may be accessed to determine whether the reserved resources are still available. Further, in one embodiment, video footage (e.g., via a surveillance video camera) of one or more docking stations may be accessed to confirm the status of the one or more docking stations. If the reserved resources are still available, data relating to the confirmation may be conveyed to the network database. If all reserved resources are not available, method 300 may proceed to block 365.

At block 365, the route and/or the requirement for the intermediate docking stations may be adjusted. Data related to adjusted route and/or a change in the required stops (e.g., for charging) may be conveyed to the network database.

At block 370, the scheduling-monitor and control may be executed. For example, a central controller (e.g., controller 105) may continuously monitor a status of a UAV to ensure the status matches the execution plan. Further, a docking station with communication capability may act as local controller to communicate with UAVs in its zone. When a UAV move across two zones (e.g., from zone 1 to zone 2), a handover signal may be sent from a local controller in a first zone (e.g., zone 1) to a local controller in a second zone (e.g., zone 2) to ensure the UAV does not collide with other UAVs. Upon a change in the execution plan, the central controller may adjust the route and/or schedule.

Modifications, additions, or omissions may be made to method 300 without departing from the scope of the present disclosure. For example, the operations of method 300 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

In one embodiment, which may enhance security, a UAV may include an authentication device (e.g. fingerprint and/or palm vein reader) to authenticate an identity of a recipient before releasing a package.

In one embodiment, a homeowner, or business owner, may install a docking station on his or her roof. This may extend the social infrastructure to public-private partnership, and may be installed together with rooftop photovoltaic (PV) solar panel. The owner may decide whether to open the docking station by controlling the accessibility of its docking station. Further, the owner may decide a price when providing charging service or simply resting service to a UAV. As an example, an owner may charge based on mileage and/or time.

As yet another example, both a UAV and a docking station may be privately owned. In this example, a system (e.g., system 100) may match one or more elements of a task request (e.g., UAV, docking stations) with a service provider (e.g., owners of a UAV, docking station, etc.). More specifically, upon receipt of a task request, the system may forward the request to one or more service providers, which may accept the request to provide one or more elements (e.g., a UAV and/or a docking station). Further, the system may ensure that scheduling and delivery meet safety standards.

Embodiments disclosed herein may have various applications, such as medicine delivery (e.g., to remote areas) and may be integrated with telehealth and/or pharmacy services for elderly care (e.g., for chronical disease treatment).

In addition to delivering of a package, one or more other tasks (e.g., surveillance tasks) may be assigned to a UAV. In one example, a UAV may be used for monitoring power transmission line vegetation. More specifically, during a route, a UAV, equipped with a camera and traveling proximate a transmission line, may monitor vegetation proximate the transmission line. In yet another example, a UAV may be used for inspecting infrastructure (e.g., bridge inspection).

Figure 8:
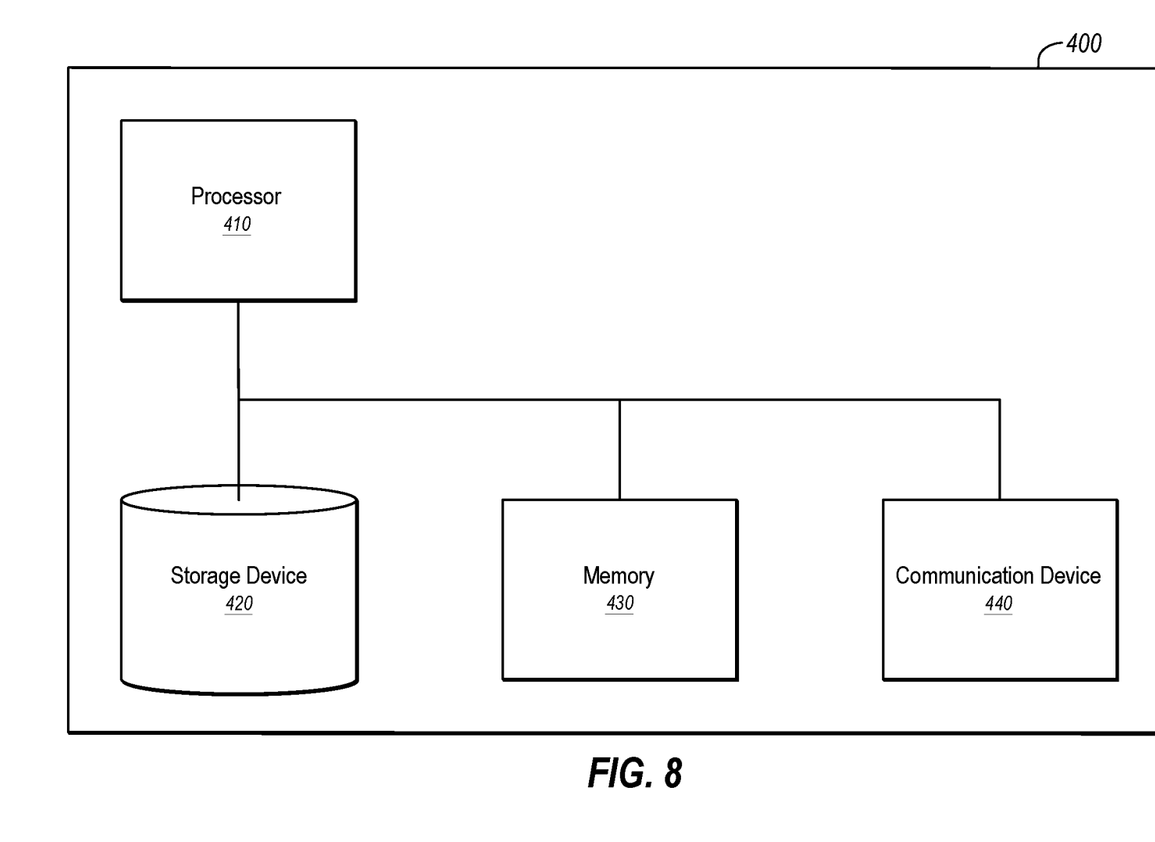
FIG. 8 is a block diagram of an example computing device.

FIG. 8 is a block diagram of an example computing device 400, in accordance with at least one embodiment of the present disclosure. Any of controller 105, communication module 126, control module 130, control module 141, and/or communication module 142 of FIGS. 1, 2, 3, and 4B may be implemented as computing device 400. Computing device 400 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing device 400 may include a processor 410, a storage device 420, a memory 430, and a communication component 440. Processor 410, storage device 420, memory 430, and/or communication component 440 may all be communicatively coupled such that each of the components may communicate with the other components. Computing device 400 may perform any of the operations described in the present disclosure.

In general, processor 410 may include any suitable special-purpose or general-purpose computer, computing entity, or processing device including various computer hardware or software modules and may be configured to execute instructions stored on any applicable computer-readable storage media. For example, processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 8, processor 410 may include any number of processors configured to perform, individually or collectively, any number of operations described in the present disclosure.

In some embodiments, processor 410 may interpret and/or execute program instructions and/or process data stored in storage device 420, memory 430, or storage device 420 and memory 430. In some embodiments, processor 410 may fetch program instructions from storage device 420 and load the program instructions in memory 430. After the program instructions are loaded into memory 430, processor 410 may execute the program instructions.

For example, in some embodiments one or more of the processing operations of a process chain may be included in data storage 420 as program instructions. Processor 410 may fetch the program instructions of one or more of the processing operations and may load the program instructions of the processing operations in memory 430. After the program instructions of the processing operations are loaded into memory 430, processor 410 may execute the program instructions such that computing device 400 may implement the operations associated with the processing operations as directed by the program instructions.

Storage device 420 and memory 430 may include computer-readable storage media for carrying or having computer-executable instructions or data structures stored thereon. Such computer-readable storage media may include any available media that may be accessed by a general-purpose or special-purpose computer, such as processor 410. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

In some embodiments, storage device 420 and/or memory 430 may store data associated with a delivery network. For example, storage device 420 and/or memory 430 may store a task database, a network database, weather forecast data, or any combination thereof.

Communication component 440 may include any device, system, component, or collection of components configured to allow or facilitate communication between computing device 400 and a network (e.g., network 107 of FIG. 1) For example, communication component 440 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication component 440 may permit data to be exchanged with any network (including network 107) such as a cellular network, a Wi-Fi network, a MAN, an optical network, etc., to name a few examples, and/or any other devices described in the present disclosure, including remote devices.

In some embodiments, communication component 440 may provide for communication within a delivery network. For example, communication component 440 may include one or more interfaces. In some embodiments, communication component 440 may include logical distinctions on a single physical component, for example, multiple interfaces across a single physical cable or optical signal.

Modifications, additions, or omissions may be made to FIG. 8 without departing from the scope of the present disclosure. For example, computing device 400 may include more or fewer elements than those illustrated and described in the present disclosure. For example, computing device 400 may include an integrated display device such as a screen of a tablet or mobile phone or may include an external monitor, a projector, a television, or other suitable display device that may be separate from and communicatively coupled to computing device 400.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. One or more non-transitory computer-readable media that include instructions that, when executed by one or more processing systems, are configured to cause the processing systems to perform operations, the operations comprising:
   receiving a request for a task identifying at least a source of a package to be delivered, a pickup time window, and a delivery destination;
   identifying a zone of a three-dimensional space that includes a pickup location of the package and the delivery destination;
   determining a delivery cost with respect to delivering the package from the pickup location to the delivery destination within the zone, the determining of the delivery cost being based on a number of available docking stations within the zone and a number of unmanned aerial vehicles flying within the zone;
   determining a delivery route between the pickup location and the delivery destination based on the determined delivery cost and based on a determined effect of navigation of the route on the number of available docking stations within the zone and on the number of unmanned aerial vehicles flying within the zone;
   selecting a particular unmanned aerial vehicle (UAV) for the task in which the particular UAV is selected in response to a determination that the particular UAV is capable of navigating the route according to the determined effect, wherein the particular UAV is a particular type of UAV;
   determining an operating velocity classification of the particular UAV, the operating velocity classification being determined based on an operating velocity capability of the particular UAV as determined according to the particular UAV being of the particular type of UAV, the operating velocity capability indicating how fast the UAV is able to fly through the air in a linear direction parallel to the ground;
   assigning, based on the operating velocity classification of the particular UAV, a particular altitude plane for the particular UAV to travel in while travelling along the determined delivery route; and
   communicating a control signal to the particular UAV in which the control signal directs performance of the task by the particular UAV to deliver the package to the delivery destination according to the determined delivery route within the particular altitude plane.

2. The computer-readable media of claim 1, wherein determining the delivery cost is further based on weather data of weather within the zone and wherein the delivery route is selected based on the weather data.

3. The computer-readable media of claim 1, further comprising reserving required resources to complete the task after selecting the particular UAV and determining the route.

4. The computer-readable media of claim 1, further comprising transmitting confirmation information to a customer including a pickup time window and a price to complete the task.

5. The computer-readable media of claim 1, further comprising:
   storing data related to the task in a task database; and
   retrieving the data related to the task from the task database upon a specified execution time.

6. The computer-readable media of claim 1, further comprising monitoring a status of the particular UAV during execution of the task.

7. An unmanned aerial vehicle (UAV) infrastructure system, comprising:
one or more zones, each zone of the one or more zones having a status indicative of at least one of a number of UAVs flying in the zone and a number of UAVs parked in the zone;
one or more docking stations positioned within the one or more zones, each docking station configured to convey power to an UAV positioned thereon; and
at least one controller configured to:
determine a task cost with respect to accomplishment of a task by a UAV within a particular zone, the determining of the task cost including determining a number of available docking stations within the particular zone and a number of unmanned aerial vehicles flying within the particular zone;
select a particular UAV to complete the task based on the task cost in which the particular UAV is selected in response to a determination that the particular UAV is capable of accomplishing the task according to a determined effect of accomplishment of the task within the particular zone by the particular UAV on the number of available docking stations within the particular zone and on the number of unmanned aerial vehicles flying within the particular zone, wherein the particular UAV is a particular type of UAV;
determine an operating velocity classification of the particular UAV, the operating velocity classification being determined based on an operating velocity capability of the particular UAV as determined according to the particular UAV being of the particular type of UAV, the operating velocity capability indicating how fast the UAV is able to fly through the air in a linear direction parallel to the ground;
assign, based on the operating velocity classification of the particular UAV, a particular altitude plane for the particular UAV to travel in while travelling along a determined delivery route; and
communicating a control signal to the particular UAV in which the control signal directs performance of the task by the particular UAV according to the determined delivery route within the particular altitude plane.

8. The UAV infrastructure system of claim 7, wherein at least one of a docking station of the one or more docking stations and the particular UAV is privately owned by a service provider.

9. The UAV infrastructure system of claim 8, wherein the at least one controller is further configured to match one or more elements of the task with the service provider.

10. The UAV infrastructure system of claim 7, wherein the one or more docking stations include at least one of a power supply, a wireless charger, a communication module, a control module, and a camera.

11. The UAV infrastructure system of claim 7, wherein at least one zone of the one or more zones includes a dedicated controller of the at least one controller.

12. The UAV infrastructure system of claim 11, wherein a dedicated controller of one zone of the one or more zones is configured to hand over control of the selected UAV to a dedicated controller of another zone of the one or more zones.

13. The UAV infrastructure system of claim 7, wherein the task comprises at least one of a delivery task and a surveillance task.

14. The UAV infrastructure system of claim 7, wherein the one or more docking stations are one of positioned on a roof top, positioned in a warehouse, coupled to a power pole, and coupled to a street light.

* * * * *